UNITED STATES PATENT OFFICE 2,585,069

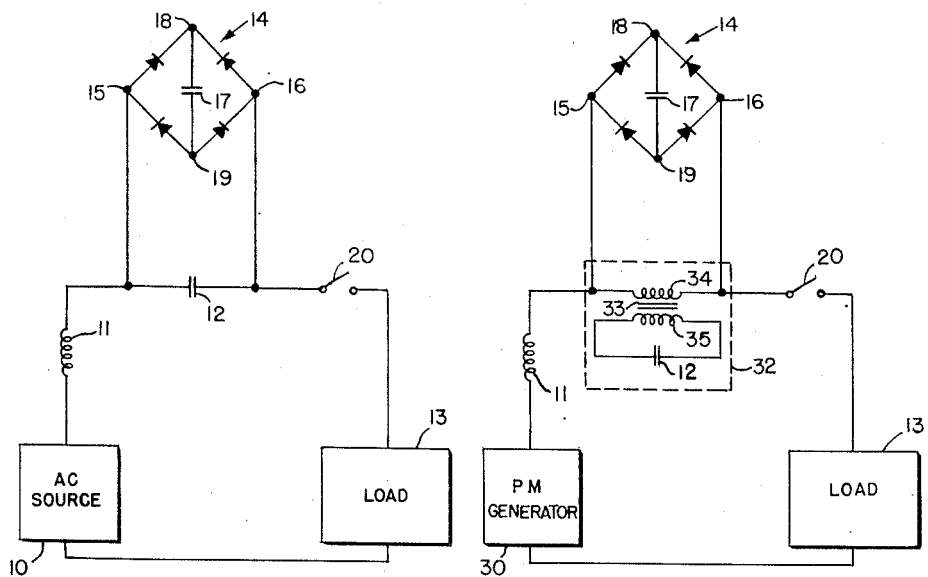
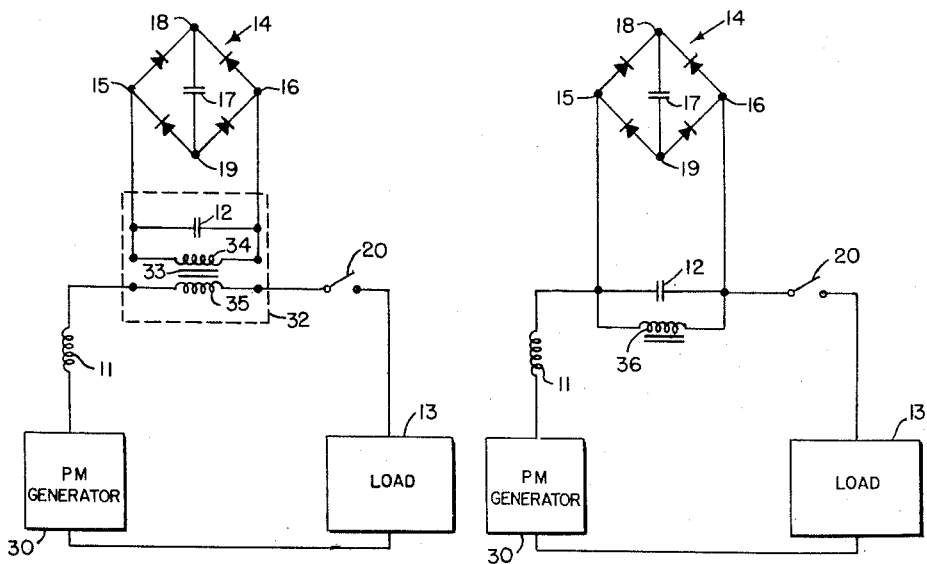
FIG. 1    FIG. 2    FIG. 3    FIG. 4
INVENTOR.
HANS K. ZIEGLER

ELECTRICAL CIRCUIT FOR PREVENTING EXCESSIVE TRANSIENTS

Hans K. Ziegler, West Long Branch, N. J., assignor to the United States of America as represented by the Secretary of the Army Application February 23, 1951, Serial No. 212,476

5 Claims. (Cl. 171—97)

(Granted under the act of March 3, 1883, as amended April 30, 1928; 370 O. G. 757)

The invention described herein may be manufactured and used by or for the Government for governmental purposes, without the payment of any royalty thereon.

This invention relates to alternating current circuits and more particularly to electrical circuits for reducing excessive transients.

My invention is especially applicable to alternating current circuits which may require a capacitive voltage compensator to neutralize the inherent inductive reactance of a permanent magnet generator or transmission line at normal load current conditions. It is well known that such electrical circuits may be subjected to excessive transients in relation to normal load operating conditions following the occurence of a sudden change in normal operating conditions or upon the initial application of the alternating current source to the load. Excessive transient voltages may occur at the compensating capacior and, unless an excessive safety factor is included in the design calculations of such a capacitor, the excessive transient voltages applied thereto may cause a breakdown in circuit operation. While at present the most important applications of my invention are in connection with permanent magnet generators or transmission lines in circuit with capacitive voltage compensators, it is to be understood that the invention is not limited thereto.

It is an object of the present invention, therefore, to provide a circuit which minimizes excessive transients in alternating current circuits without affecting normal operation.

It is another object of the invention to reduce the natural frequency of an alternating current circuit during a transient without affecting the normal operation of the original electrical circuit components.

It is still another object of the invention to provide means for automatically minimizing excessive transients in alternating current circuits without affecting normal load operating conditions.

It is a specific object of my invention to increase the capacity of the compensating capacitor during the transient period and automatically cut out the additional capacity after the transient is over.

In accordance with the present invention, there is provided a circuit for minimizing the effects of transients in an alternating current circuit wherein the inductive reactance is compensated by a capacitive reactance in series arrangement therewith. Means are provided to considerably increase the capacitance in series with the inductive reactance only during a transient period and to automatically cut out the additional capacity immediately following the occurrence of the transient.

For a better understanding of the present invention, together with other and further objects thereof, reference is had to the following description taken in connection with the accompanying drawings in which:

Fig. 1 diagrammatically represents an embodiment of my invention; and

Figs. 2, 3 and 4 represent embodiments of my invention as applied to a permanent magnet generator.

Referring now to Fig. 1 of the drawings, my invention is diagrammatically shown as applied to an electrical circuit comprising an alternating current source 10 having a prescribed output frequency $f$, an inductive reactance 11, a capacitive reactance, as indicated by capacitor 12, in electrial series arrangement with said inductive reactance, and a load 13. The series arrangement is connected between source 10 and load 13. Electrically, the reactive components 11 and 12 may respectively represent the inherent inductive reactance of the alternating current source 10 or a transmission line connecting the source 10 to load 13, and the capacitive reactance to neutralize the inductive reactance under normal load conditions.

Connected across the compensating capacitor 12 is a rectifier 14. The rectifier may, if desired, be of the copper oxide or dry rectifier type connected in the full-wave bridge circuit consisting of four rectifier units. The terminals 15 and 16 of rectifier 14 serve as the A.-C. input terminals and are connected across compensating capacitor 12. A transient responsive capacitor 17, hereinafter referred to as the rectifier capacitor, is connected across the D.-C. output terminals 18 and 19 of said rectifier. A suitable switch 20 may be provided to connect the load 13 to the alternating current source 10.

It is well known that if the natural frequency $f_0$ of the circuit is considerably smaller than the applied frequency $f$ of the alternating current source, the magnitude of the transients may be greatly reduced. The effect of my present invention is to increase the capacitance of the circuit only during transient operation, thus decreasing the natural $f_0$ of the circuit during this period.

At the instant switch 20 is closed, compensating capacitor 12 and the rectifier capacitor 17 may be considered to be in parallel arrangement. The natural frequency $f_0$ of the circuit will therefore be reduced in accordance with the additional capacitance provided at this instant by said rectifier capacitor. Inasmuch as the transient voltage is rectified by the full-wave rectifier 14 and is applied to capacitor 17 as a direct current voltage, capacitor 17 will be charged to the peak value of the first transient voltage cycle.

At the peak of the transient voltage, rectifier capacitor 17 and compensating capacitor 12 are no longer in parallel circuit arrangement since the rectifier prevents current flow in the inverse direction thus precluding the discharge of rectifier capacitor 17. Immediately after the peak transient voltage has occurred, rectifier capacitor 17 may be considered as removed from the circuit so that for normal load conditions only the serially connected compensating capacitor 12 is effectively in the circuit. Rectifier capacitor 17 will remain ineffective as long as no higher transient voltage follows the first one. Thus, the switch-over from increased capacity to original capacity takes place automatically at the instant where the voltage of the alternating current source is at or near the peak. It is well known that transients can be limited if a circuit is closed at the instant the voltage of the alternating current source goes through its maximum. This arrangement, therefore, provides the means for automatically decreasing the natural frequency $f_0$ for only transient conditions, thereby reducing the effects of excessive transients.

After the transient has passed, the voltage of the rectifier capacitor 17 is gradually reduced due to leakage to the peak voltage of the normal operating voltage across compensating capacitor 12. For any further transients having higher voltage peaks than the momentary voltage at the compensating capacitor, capacitor 17 is again automatically placed in parallel arrangement with compensating capacitor 12 to reduce the natural frequency $f_0$ as described above. If desired, a high resistance discharge resistor, not shown, may be placed across capacitor 17.

Figs. 2-4 illustrate the application of my invention to circuits employing a permanent magnetic generator as the source of alternating current. Although my invention is not limited thereto, I have chosen to represent an embodiment of my invention as applied to a permanent magnet generator wherein the capacitive reactance is introduced by connecting the primary of a transformer in series with the armature and the outgoing line and by connecting the compensating capacitor across the secondary.

Referring now to Fig. 2 there is illustrated a permanent magnet generator 30 having an inherent inductive reactance, as indicated by the inductance 11, a compensator 32 consisting of an iron core transformer 33 having a primary winding 34 and a secondary winding 35, and a compensating capacitor 12 connected across secondary 35. The primary winding 34 is connected in series with the permanent magnetic generator 30 and a load circuit 13.

Connected across the terminals of primary transformer is a rectifier 14. The rectifier may, if desired, be of the copper oxide or dry rectifier type connected in the full-wave bridge circuit consisting of four rectifier units. The terminals 15 and 16 of said rectifier serve as the A.-C. input terminals and are connected across the primary 34 of transformer 33. The D.-C. output terminals 18 and 19 of the rectifier are connected across a transient responsive capacitor 17. If the capacity of the condenser is C, the frequency F, and the primary and secondary turns are $N_p$ and $N_s$, and the primary and secondary voltages and currents are $V_p$, $V_s$ and $I_p$ and $I_s$, then it can be shown that the effect of the capacity C across the secondary is the same as that of a capacity $$C\left(\frac{N_s}{N_p}\right)^2$$

across the primary. By this arrangement it can readily be seen that for transient voltages, the rectifier capacitor 17 may be considered as being shunted across the compensating capacitor 12 to minimize the effect of excessive transients as described in connection with Fig. 1 supra.

In Fig. 3 the input terminals 15 and 16 of rectifier 14 are connected across secondary 35 in parallel arrangement with the compensating capacitor 12. In Fig. 4 the rectifier 14 and the compensating capacitor 12 are connected in parallel arrangement with a saturable inductor 36 and, as shown, said parallel arrangement is connected in series with the permanent magnet generator 30 and load circuit 13. The operation of the embodiments shown in Figs. 3 and 4 is identical to that described in connection with Fig. 1.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. In an alternating current circuit wherein an inductive reactance is compensated by a first capacitor in electrical series connection with said reactance, means for preventing excessive transient voltages across said capacitor, said means comprising a second capacitor, a full-wave rectifier having input and output terminals, said first capacitor being connected across said input terminals, and said second capicitor being connected across said output terminals.

2. An alternating current circuit comprising an inductive reactance, a compensator in series with said inductive reactance, said compensator comprising a transformer having a primary winding and a secondary winding, said primary winding being connected in electrical series arrangement with said inductive reactance, a first capacitor connected across said secondary winding, means for preventing excessive transient voltages across said first capacitor, said means comprising a full-wave rectifier having input and output terminals, said input terminals being connected across said secondary winding, and a second capacitor connected across said output terminals.

3. In an alternating current circuit, an inductive reactance, a first capacitor in electrical series arrangement with said reactance to compensate for said inductive reactance under normal load, means for preventing excessive transient voltages across said capacitor, said means comprising a saturable reactor connected across said first capacitor, a full-wave rectifier having input and output terminals, said first capacitor being connected across said input terminals, and a second capacitor connected across said output terminals.

4. An alternating current circuit comprising an inductive reactance, a primary winding and a secondary winding, said primary winding being connected in electrical series arrangement with said inductive reactance, a first capacitor, connected across said secondary winding, a full-wave rectifier having input and output terminals, said input terminals being connected across said primary winding, and a second capacitor connected across said output terminals.

5. An electrical circuit comprising an alternating current source having a prescribed output frequency, an inductive reactance and a compensating capacitive reactance in electrical series arrangement with said source, the resonant frequency of said inductive and capacitive reactance being substantially equal to said prescribed frequency, and means in circuit with said capacitive reactance responsive only to transients whereby said resonant frequency is effectively reduced for the duration of said transients.

HANS K. ZIEGLER.

No references cited.